2,905,700

PHOSPHORUS DERIVATIVES

Jean Metivier, Arpajon, France, assignor to Societe des Usines Chimiques Rhone-Poulenc, Paris, France, a corporation of France No Drawing. Application February 24, 1958
Serial No. 716,884

Claims priority, application France March 4, 1957

4 Claims. (Cl. 260—345.9)

This invention relates to new phosphorus esters and their preparation.

It is an object of the invention to provide new phosphorus derivatives of considerable industrial interest and more particularly useful as pesticidal agents.

In Patent No. 2,778,767 I have disclosed phosphorus derivatives of kojic acid of the general formula:

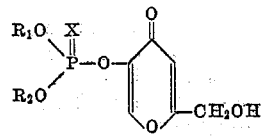

I where X represents an oxygen or a sulphur atom and $R_1$ and $R_2$ are the same or different and are each a lower alkyl radical containing up to 4 carbon atoms, e.g. methyl or ethyl.

The aforesaid compounds of Formula I have very interesting insecticidal properties both as contact and as systemic insecticides. As the result of further research and experimentation a further group of phosphorus esters has now been found which, despite the fact that they differ from the aforesaid compounds only in the nature of substitution in the 2-position of the pyrone nucleus, possess outstandingly superior insecticidal properties and are useful acaricides.

This new group of phosphorus esters consists of compounds of the general formula:

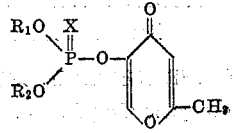

II (in which X represents an oxygen or sulphur atom and $R_1$ and $R_2$ are the same or different and represent lower alkyl groups containing from 1 to 5 carbon atoms, e.g. methyl, ethyl or propyl).

The new products of Formula II may be obtained, according to a feature of the invention, by reacting an acid halide, more especially chloride, of the formula:

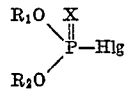

III where Hlg represents a halogen atom, with a pyrone of the general formula:

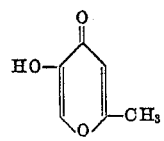

IV in the presence of a basic condensing agent such as metallic sodium, sodium carbonate, sodium hydroxide or sodium or potassium ethylate. The condensing agent can be added to the mixture of the reactants but it can also be reacted with the pyrone of Formula IV, before bringing it into contact with the acid halide of Formula III, in such a way as to convert it into a reactive salt.

The reaction can be carried out in an inert organic liquid such as an alcohol, a ketone or an aromatic hydrocarbon. The operation can be conveniently carried out at a temperature between room temperature and 150° C. and preferably at the boiling point of the solvent used. Hence the liquid medium is preferably one which boils at a temperature not in excess of about 150° C.

The present invention includes within its scope pesticidal compositions containing at least one phosphorus ester of the Formula II in association with one or more diluents compatible with the phosphoric ester or esters and suitable for use as pesticides. The compositions can be solid formulations when a solid powdered compatible diluent such as talc, calcined magnesium oxide, kieselguhr, tri-calcium phosphate, cork dust, absorbent charcoal, or a clay, such as kaolin or bentonite, is used, the quantity of phosphoric ester being preferably between 0.005 and 50% by weight of the composition. Alternatively, the phosphorus derivative can be dissolved or dispersed in a liquid, its concentration being preferably between 0.005 and 50% by weight of the composition. The composition may thus be presented in the form of an aerosol, a suspension, an emulsion or a solution in an organic or aqueous-organic medium, for example, an aromatic hydrocarbon such as toluene or xylene, or a mineral, animal, or vegetable oil or again a mixture of these diluents. The compositions in the form of dispersions, solutions or emulsions can contain wetting, dispersing or emulsifying agents of ionic or non-ionic type, for example sulphated ricinoleates, quaternary ammonium derivatives or products based on ethylene oxide condensates such as the condensates of ethylene oxide with octylphenol or the fatty acid esters of anhydrosorbitols which are rendered soluble by etherification of the free hydroxyl groups by condensation with ethylene oxide. It is preferable to use the non-ionic agents since they are not affected by electrolytes. When it is desired to form emulsions, the phosphorus derivatives can be used in the form of self-emulsifiable concentrates containing the active substance dissolved in the dispersing agent or in a solvent compatible with that agent, producing, with the simple addition of water, compositions ready for use.

The solid compositions are preferably prepared by grinding the phosphorus derivatives with the solid diluent or by impregnating the solid diluent with a solution of the phosphorus derivative in a volatile solvent, evaporating the solvent, and, if necessary, grinding the product to obtain a powder.

The new compounds can be used in admixture with other pesticides including substances producing a synergistic effect.

The invention is illustrated by the following examples.

Example 1

A mixture of 2-methyl-5-hydroxy-4-pyrone (25.2 g.), ethyl alcohol (250 cc.) and a 1.35 N solution of sodium ethylate in ethyl alcohol (148.3 cc.) is heated for 10 minutes at 60° C. After cooling to 30° C. diethylchlorothiophosphate (37.6 g.) is added over 8 minutes and the mixture stirred at laboratory temperature for 1 hour. After heating for 4 hours at 50° to 60° C. the mixture is allowed to cool, the precipitate which collects is filtered, and the filtrate treated with decolourising charcoal. After distillation of the solvent by heating at 40° C. under a pressure of 20 mm. of mercury the oil which remains is taken up in water (100 cc.) and it is extracted into chloroform (3 x 100 cc.). The chloroformic phase is separated by decantation and dried over calcium chloride. The solution is concentrated in vacuo by heating at 40° C. under 20 mm. of mercury pressure; a crystallised residue (49 g.) remains.

By recrystallisation from petroleum ether 2-methyl-5-O,O-diethylthionophosphoryl-4-pyrone (M.P. 51° C. cap.) is obtained.

*Example 2*

A 1.1 N solution of sodium ethylate in ethyl alcohol (182 cc.) is added to a boiling solution of 2-methyl-5-hydroxy-4-pyrone (25.2 g.) in ethyl alcohol (200 cc.). After cooling to 30° C., dimethylchlorothiophosphate (35.3 g.) is added and the mixture stirred for 1 hour at room temperature and then heated at 45° C. for 2 hours. After cooling the sodium chloride which forms is separated, the filtrate treated with decolourising charcoal and the solvent distilled off by heating at 40° C. under a pressure of 20 mm. of mercury. The residue obtained is taken up in water (100 cc.) and extracted with chloroform (3 x 100 cc.). The combined choroformic solutions are dried over calcium chloride and treated with decolourising charcoal. After filtration and concentration under 20 mm. of mercury at 40° C., a residual oil (43 g.) is obtained, the analysis of which corresponds to 2-methyl-5-O,O-dimethylthionophosphoryl-4-pyrone. The 2-methyl-5-hydroxy-4-pyrone which is the starting material in Examples 1 and 2 can be prepared according to Yabuta: J. Chem. Soc. 578 (1924).

*Example 3*

Potassium carbonate (41.4 g.) is added to a solution of 2-methyl-5-hydroxy-4-pyrone (25.2 g.) in acetone (100 cc.), and the mixture is stirred for fifteen minutes at laboratory temperature.

Diisopropylchlorothiophosphate (45.5 g.) is added to the suspension obtained and the mixture is stirred for an hour. After refluxing for two hours the precipitate is filtered off and the clear filtrate is concentrated at 40°–50° C. under 20–30 mm. of mercury. An oily residue (62 g.) remains. This residue is taken up in benzene (150 cc.), and the benzene solution is washed with water (2 x 100 cc.).

The benzene filtrate is dried with sodium sulphate and concentrated by warming to 40° C. under a pressure of 20–30 mm. of mercury until all distillation ceases. The residue obtained is an oil, whose analysis shows it to be 2-methyl - 5 - O,O-diisopropylthionophosphonyl-4-pyrone (55 g.).

*Example 4*

2-methyl - 5 - O,O-diethylthionophosphoryl-4-pyrone (1 g.) is dissolved in acetone (5 cc.), and toluene (2 cc.) and the condensation product of ethylene oxide with octylphenol (1.5 g.) added. After stirring the volume is made up to 10 cc. with acetone. There is thus obtained a 10% solution of the active product. This solution can be converted into an emulsion by the addition of water. To obtain, for example, a 0.05% emulsion, 1 cc. of the 10% solution is diluted with 200 cc. of water.

Proceeding in the same manner but replacing the acetone with dimethyl formamide a 10% solution is obtained which can be converted into aqueous emulsions.

By way of illustration of the utility of the compounds of the invention as pesticidal agents, they are for example, highly effective against flies (e.g. *Ceratitits capitata*), mites (e.g. *Paratetranychus pilosus* and *Tetranychus telarius*), aphids (e.g. *Aphis fabae* and *Aphis pomi*), and weevils (e.g. *Centhorrynchus assimilis*).

I claim:

1. As a new pesticidal agent, a phosphorus derivative of the general formula:

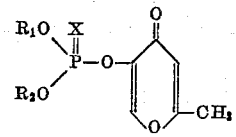

where X is selected from the group consisting of oxygen and sulphur atoms and $R_1$ and $R_2$ are each an alkyl radical containing at most 5 carbon atoms.

2. As a new pesticidal agent, 2-methyl-5-O,O-diethylthionophosphoryl-4-pyrone.

3. As a new pesticidal agent, 2-methyl-5-O,O-dimethylthionophosphoryl-4-pyrone.

4. As a new pesticidal agent, 2-methyl-5-O,O-diisopropylthionophosphoryl-4-pyrone.

References Cited in the file of this patent

UNITED STATES PATENTS

| | | |
|---|---|---|
| 2,316,371 | Strother | Apr. 13, 1943 |
| 2,622,095 | Brannock | Dec. 16, 1952 |
| 2,715,130 | Krimmel | Aug. 9, 1955 |
| 2,752,283 | Metivier | June 26, 1956 |
| 2,766,259 | Whetstone | Oct. 9, 1956 |
| 2,778,767 | Metivier | Jan. 22, 1957 |
| 2,811,476 | Metivier | Oct. 29, 1957 |

FOREIGN PATENTS

| | | |
|---|---|---|
| 713,278 | Great Britain | Aug. 11, 1954 |

OTHER REFERENCES

Elderfield: Heterocyclic Cmpds., vol. 1, p. 385, Wiley (1950).